US009494708B2

(12) United States Patent
Le Roux et al.

(10) Patent No.: US 9,494,708 B2
(45) Date of Patent: Nov. 15, 2016

(54) STREAMER CLEANING DEVICE AND METHOD

(71) Applicant: CGGVERITAS SERVICES SA, Massy (FR)

(72) Inventors: Pierre Le Roux, Massy (FR); Raphaël Macquin, Montrouge (FR); Frédéric Simonnot, Paris (FR)

(73) Assignee: CGG SERVICES SA, Massy (FR)

( * ) Notice: Subject to any disclaimer, the term of this patent is extended or adjusted under 35 U.S.C. 154(b) by 565 days.

(21) Appl. No.: 13/912,404

(22) Filed: Jun. 7, 2013

(65) Prior Publication Data

US 2013/0327355 A1 Dec. 12, 2013

Related U.S. Application Data

(60) Provisional application No. 61/657,511, filed on Jun. 8, 2012.

(51) Int. Cl.
*B08B 9/00* (2006.01)
*G01V 13/00* (2006.01)

(52) U.S. Cl.
CPC ..................... *G01V 13/00* (2013.01)

(58) Field of Classification Search
None
See application file for complete search history.

(56) References Cited

U.S. PATENT DOCUMENTS

| 3,359,536 | A | * | 12/1967 | Coburn, Jr. | G01V 1/3826 367/16 |
| 6,012,406 | A | * | 1/2000 | Dudley | B63B 3/08 114/254 |
| 7,145,833 | B1 | | 12/2006 | Hoogeveen | |
| 2010/0307402 | A1 | * | 12/2010 | Rinnan | G01V 1/3826 114/243 |
| 2011/0197919 | A1 | | 8/2011 | Tilley | |
| 2012/0006554 | A1 | * | 1/2012 | Allen | B08B 1/008 166/338 |
| 2012/0222709 | A1 | | 9/2012 | Karlsen et al. | |
| 2013/0265850 | A1 | | 10/2013 | Wu | |

FOREIGN PATENT DOCUMENTS

| FR | 2 981 586 | 4/2013 |
| WO | 2008/068622 A2 | 6/2008 |
| WO | 2012/039625 A1 | 3/2012 |

OTHER PUBLICATIONS

Search Report in corresponding Australian Patent Application No. 2013206189 dated May 6, 2016.
Office Action in corresponding French Patent Application No. 1355334 dated Sep. 6, 2016.

* cited by examiner

*Primary Examiner* — Eric Golightly
(74) *Attorney, Agent, or Firm* — Patent Portfolio Builders PLLC

(57) ABSTRACT

Method and cleaning device for cleaning a seismic streamer. The cleaning device includes a flexible body having a shape that wraps around a longitudinal axis; a movement-generating device attached to an end portion of the flexible body; and first cleaning elements provided on a first portion of the flexible body and configured to clean the seismic streamer. The flexible body is configured to wrap around the seismic streamer.

18 Claims, 8 Drawing Sheets

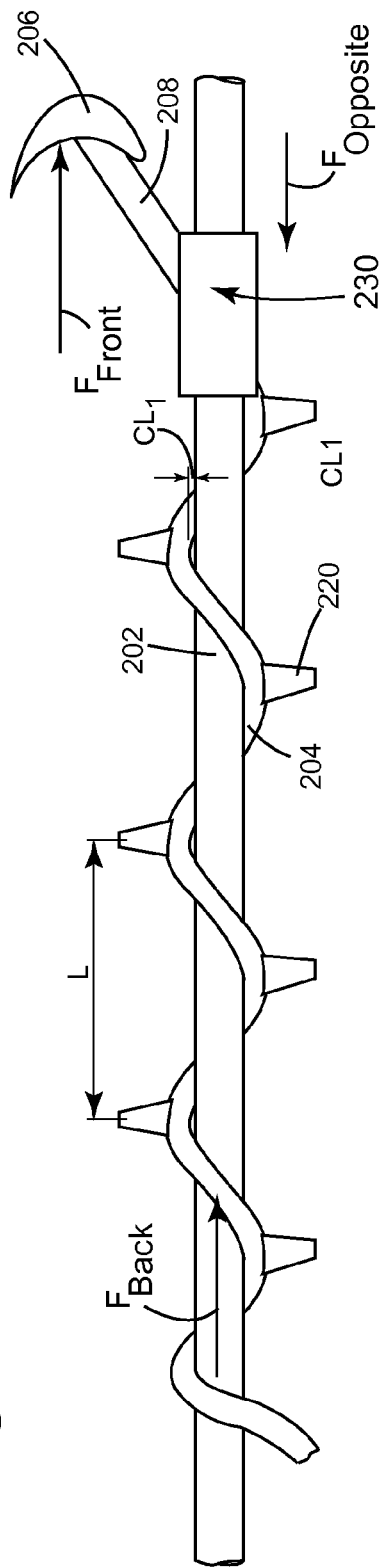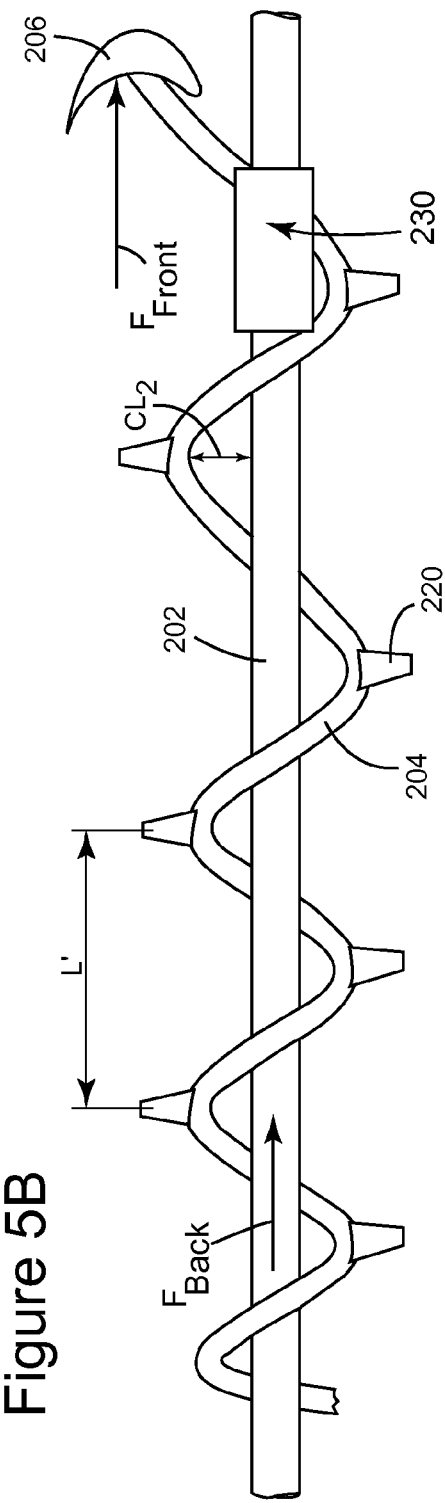
Figure 5A
Figure 5B

STREAMER CLEANING DEVICE AND METHOD

CROSS-REFERENCE TO RELATED APPLICATIONS

The present application is related to and claims the benefit of priority of U.S. Provisional Application Ser. No. 61/657,511, filed Jun. 8, 2012, having the title "Streamer Cleaning Device and Method," and being authored by P. Le Roux, R. Macquin and F. Simonnot, the entire contents of which are incorporated herein by reference.

BACKGROUND

1. Technical Field

Embodiments of the subject matter disclosed herein generally relate to methods and systems and, more particularly, to mechanisms and techniques for cleaning seismic equipment that is deployed in water or underwater.

2. Discussion of the Background

During the past years, interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys to more accurately decide where to drill in order to avoid a dry well.

Marine seismic data acquisition and processing generate a profile (image) of the geophysical structure (subsurface) under the seafloor. This profile is used by those trained in the field to evaluate the presence or absence of oil and/or gas traps. Thus, providing a high-resolution image of the subsurface is an ongoing process for the exploration of natural resources, including, among others, oil and/or gas.

During a seismic gathering process, as shown in FIG. 1, a vessel 10 tows an array of seismic detectors provided on streamers 12. The streamers may be disposed horizontally, i.e., lying at a constant depth relative to a surface 14 of the ocean. The vessel 10 also tows a sound source assembly 16 that is configured to generate an acoustic wave 18. The acoustic wave 18 propagates downward, toward the seafloor 20, and penetrates the seafloor until eventually a reflecting structure 22 (reflector) reflects the acoustic wave. The reflected acoustic wave 24 propagates upward until it is detected by a detector on streamer 12.

The above-noted arrangement is towed underwater for days, if not weeks, for a given survey. Thus, it was noted that various marine animals, e.g., barnacles, attach to various components of the streamer, e.g., external skin, electronic components, birds, etc. The barnacles may change the desired weight of the streamer, may make the streamer deviate from its desired towed position, or simply may make it difficult to manipulate the streamer for maintenance or when deployed underwater.

Traditional methods employ a cleaning device configured to move along the streamer and clean the streamer of marine animals. However, there are problems with these devices because they are bulky and they need to travel along various elements (e.g., birds, electronic boxes, etc.) connected to the streamer. Accordingly, it would be desirable to provide systems and methods that avoid the afore-described problems and drawbacks.

SUMMARY

According to one exemplary embodiment, there is a cleaning device for cleaning a seismic streamer. The cleaning device includes a flexible body having a shape that wraps around a longitudinal axis, a movement-generating device attached to an end portion of the flexible body, and first cleaning elements provided on a first portion of the flexible body and configured to clean the seismic streamer. The flexible body is configured to wrap around the seismic streamer as a coil.

According to another exemplary embodiment, there is a cleaning device for advancing along a seismic streamer. The cleaning device includes a body having a helicoidal or spiral shape; a movement-generating device attached to an end portion of the body and configured to generate a first force along the streamer; plural wings attached to the body and configured to generate a second force along the streamer; and first cleaning elements provided on a first portion of the body and configured to clean the seismic streamer. The body is configured to wrap around the seismic streamer, and the first and second forces act on the body to move it along the seismic streamer in a direction opposite to a movement of the streamer.

According to another exemplary embodiment, there is a method for cleaning a seismic streamer with a cleaning device. The method includes a step of wrapping the body of the cleaning device around a portion of the seismic streamer so that the body has a coil shape; a step of applying a first force on the body with a movement-generating device attached to an end portion of the body; a step of applying a second force on the body with plural wings attached to the body; and a step of cleaning the seismic streamer with first cleaning elements provided on a first portion of the flexible body. The first and second forces act on the body to move it along the seismic streamer in a direction opposite to a movement of the streamer in water.

BRIEF DESCRIPTION OF THE DRAWINGS

The accompanying drawings, which are incorporated in and constitute a part of the specification, illustrate one or more embodiments and, together with the description, explain these embodiments. It is noted that no dimensions should be inferred from the drawings unless specifically indicated in the specification. In the drawings:

FIGS. 5A-B are schematic diagrams illustrating a change in shape of a cleaning device according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer having an obstacle, e.g., a bird, and a cleaning device that can travel along the streamer and pass the obstacle. However, the embodiments to be discussed next are not limited to a streamer, but may be applied to other structures that are exposed to a marine environment, for example a cable.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a cleaning device for cleaning a seismic streamer. The cleaning device includes a flexible body having a spiral or helicoidal shape, a movement-generating device attached to an end portion of the flexible body, and first cleaning elements provided on a first portion of the flexible body and configured to clean the seismic streamer. The flexible body is configured to wrap around the seismic streamer as a coil. The body may also include wings for rotating the cleaning device around the streamer. Other cleaning elements and/or repairing elements may be attached to the body.

Figure 1:
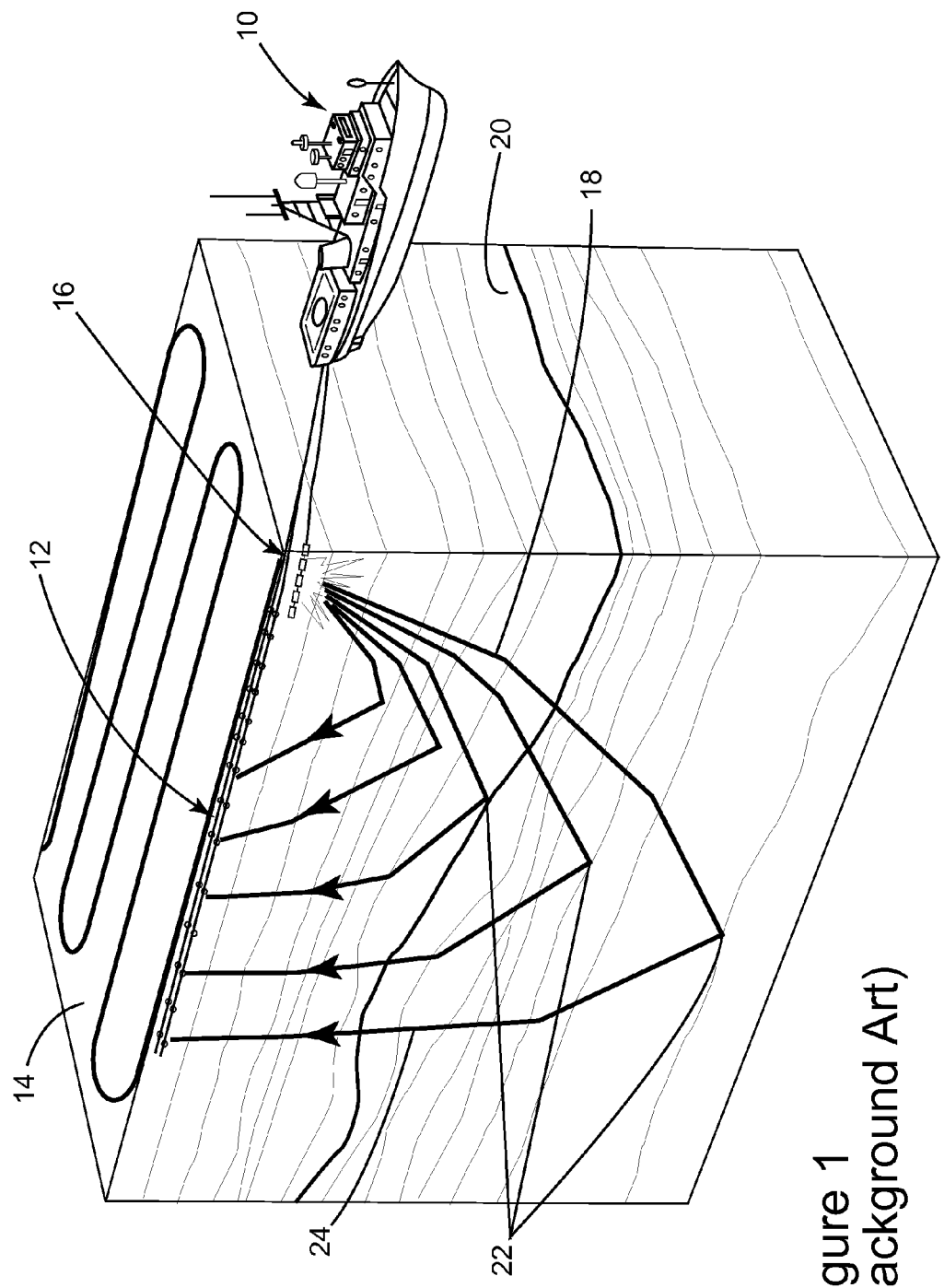
FIG. 1 is a schematic diagram of a conventional seismic data acquisition configuration.
Figure 2A:
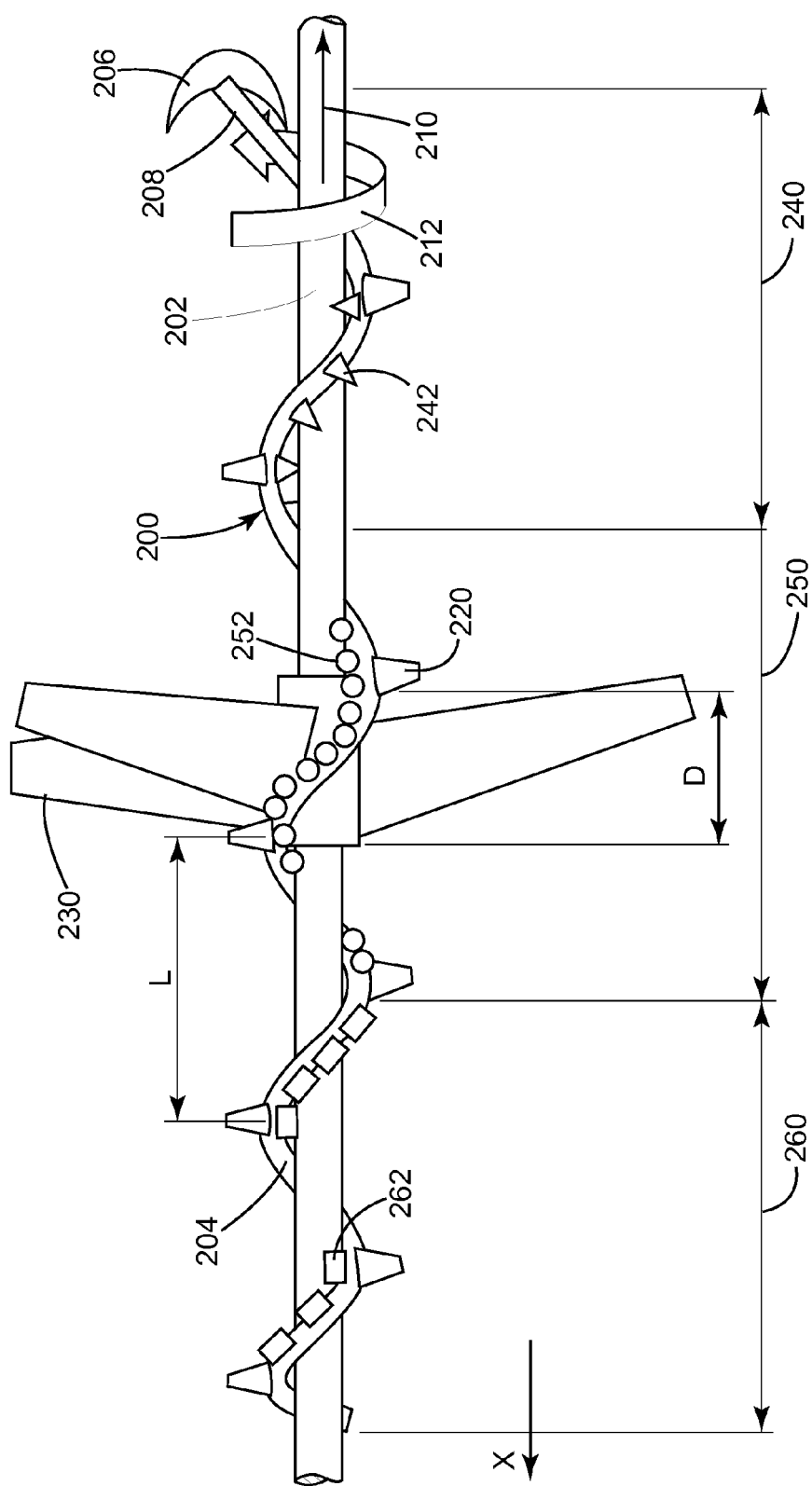
FIGS. 2A-B are schematic diagrams of a cleaning device according to embodiments.
Figure 2B:
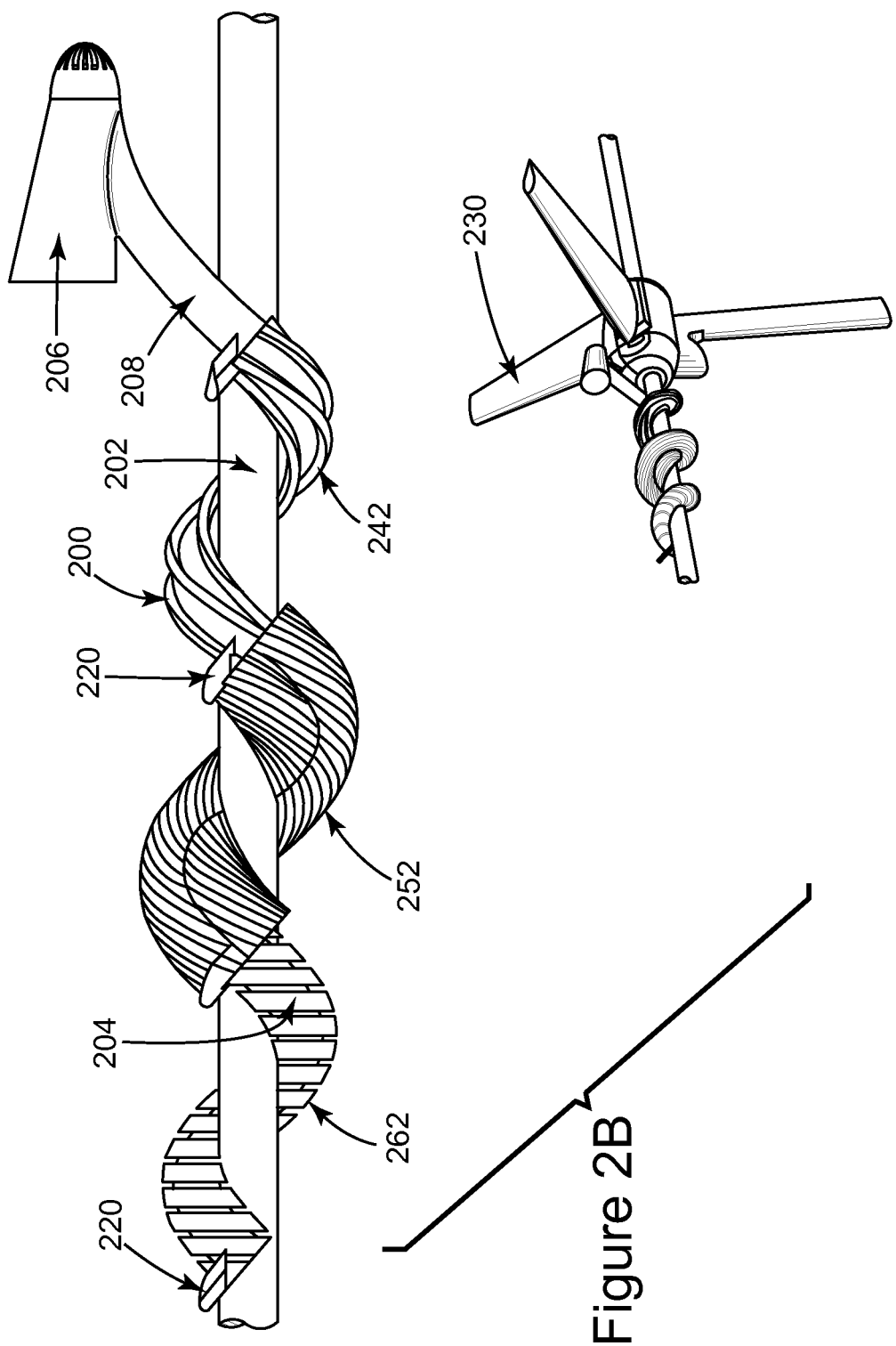

According to an exemplary embodiment illustrated in FIG. 2A, a cleaning device 200 is deployed over (around) a streamer 202 for providing one or more functions (e.g., cleaning, repairing, etc.) to the streamer. The streamer 202 extends into the water and is towed by a vessel (not shown) along direction X. The cleaning device 200 has a body 204 made of a flexible material, e.g., composite, plastic, metal or a combination thereof. However, the body does not have to flexible, i.e., it may be rigid. The body 204 has a helicoidally or spiral-type shape and may be wrapped around the streamer 202. In other words, the body is configured to wrap around a central, longitudinal axis (like a coil) with a constant radius, varying radius or a combination of the two. Body 204 preferably is able to twist one portion relative to another portion, i.e., it is flexible for reasons to be discussed later. Thus, the body 204 may have a spring shape as shown in FIGS. 2A and 2B and is capable of compressing or extending depending on the applied forces.

Figure 3:
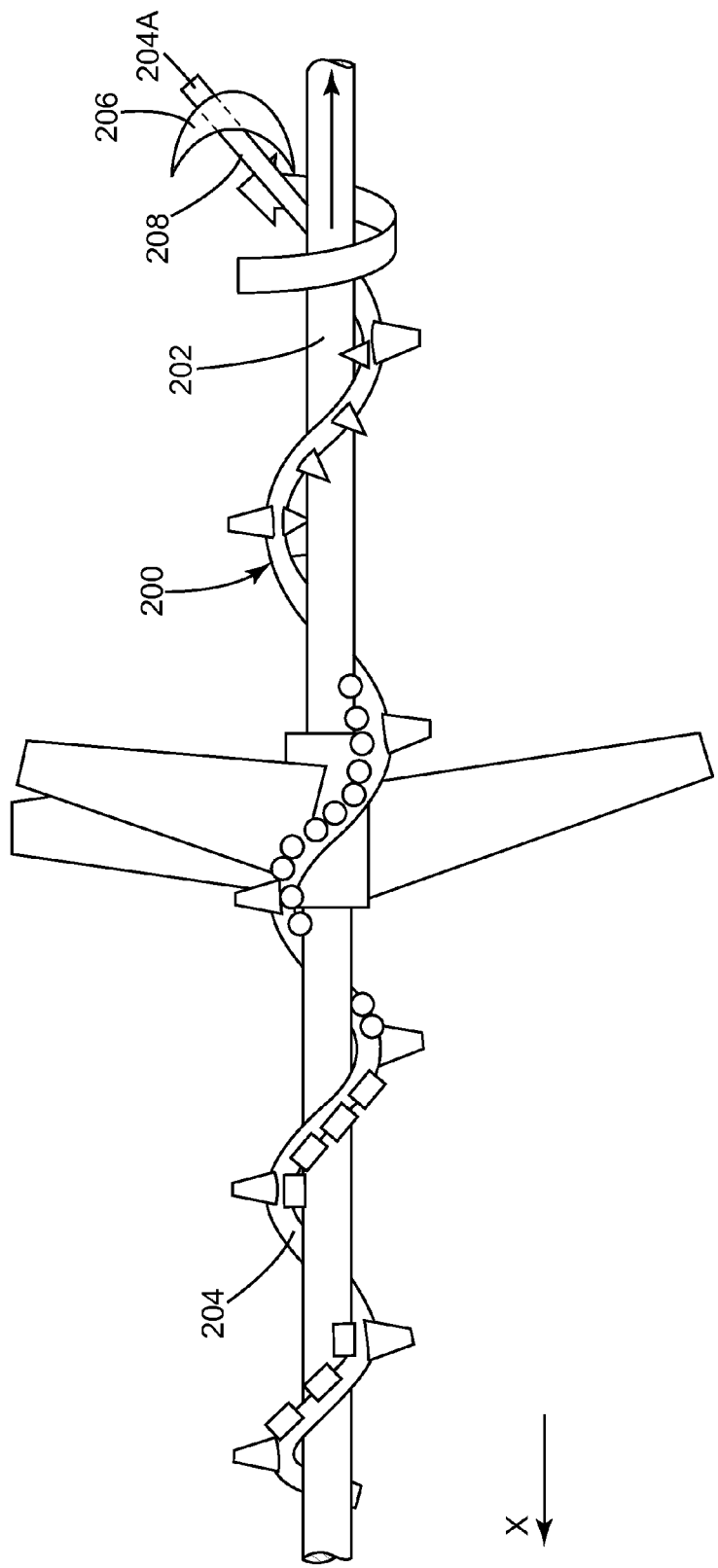
FIG. 3 is a schematic diagram of a another cleaning device according to an embodiment.
Figure 4A:
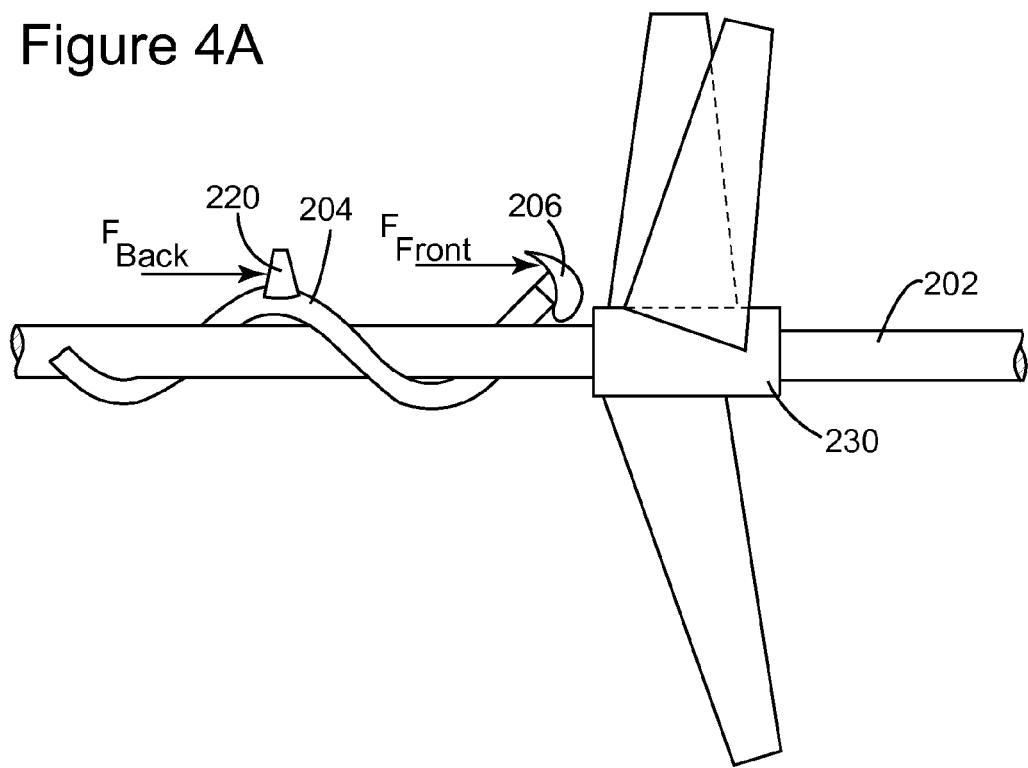
FIGS. 4A-D are schematic diagrams illustrating how a cleaning device passes an obstacle attached to the streamer according to an embodiment.
Figure 4B:
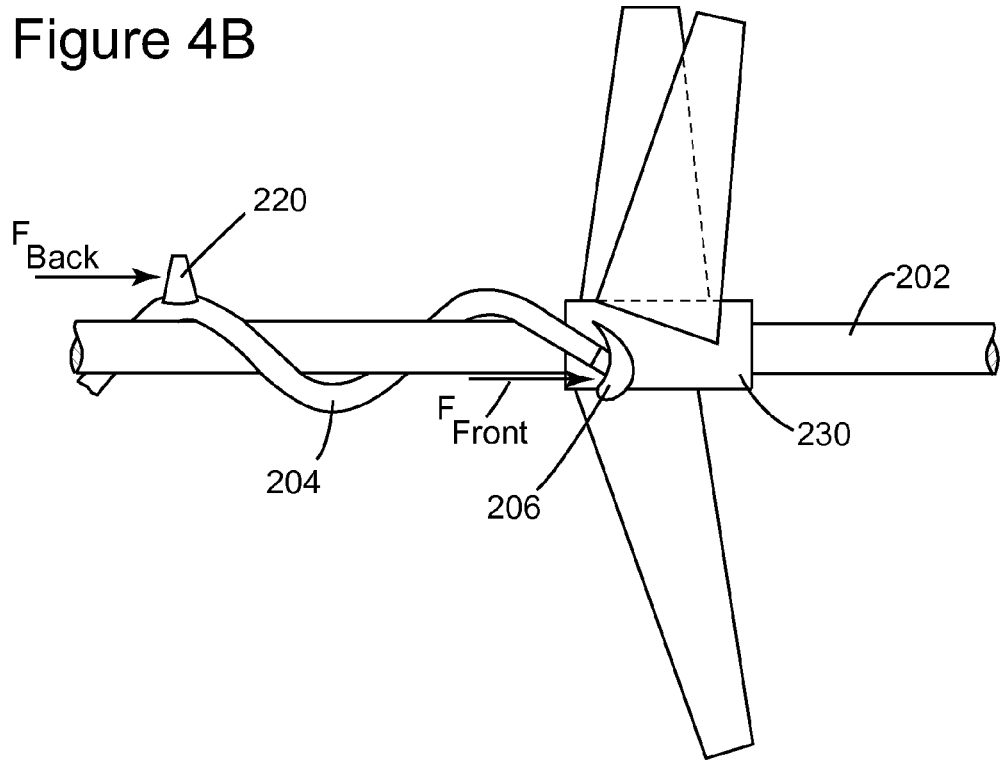
Figure 4C:
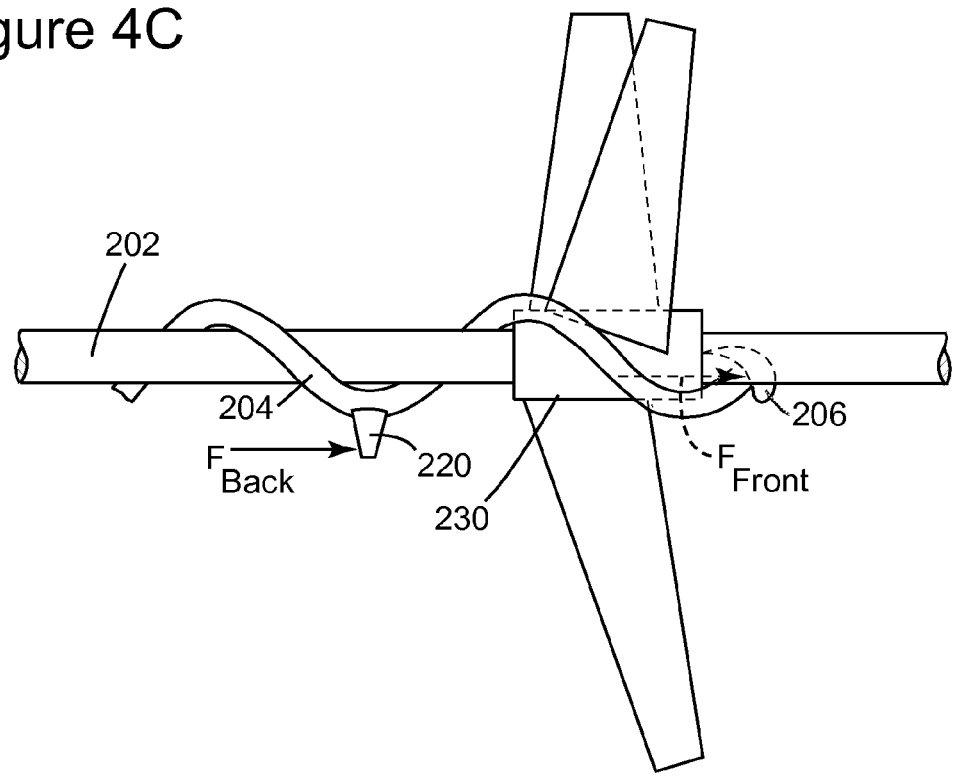
Figure 4D:
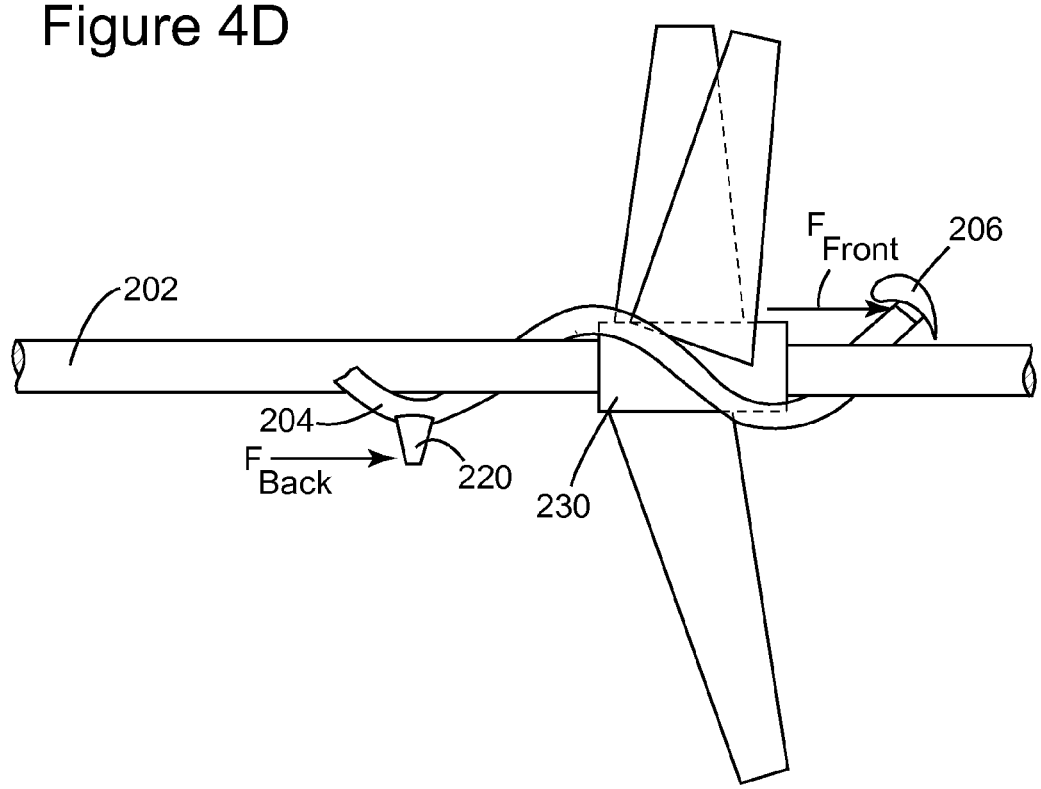

For making the cleaning device 200 advance along the streamer 202, a movement-generating device 206 is provided at one end 208 of the body 204. The movement-generating device 206 may be provided so that no part of the body 204 extends past it (as shown in FIGS. 2A and 2B) or so that a portion 204A of the body 204 extends through the movement-generating device 206 as show in FIG. 3. The movement-generating device 206 may be an anchor or a surface configured to be acted upon by the water while the streamer is towed with a given velocity so that the cleaning device 200 is drag-propelled while the streamer is towed. In one application, the movement-generating device 206 may be configured to not only impart a translational movement 210 to the body 204, but also a rotational movement 212. In another application, the movement-generating device may include a propeller and/or a motor, a battery, a controller, etc.

For providing rotational motion to the body 204, or for supplementing the rotational motion, wings 220 may be provided along the body 204. The wings 220 may be formed of the same material as the body 204 or of different materials. The wings 220 may be fixed to or detachable from the body 204. The wings 220 are oriented relative to the body 204 so that due to the motion of the streamer along direction X, the water acts on the wings 220 to rotate them and implicitly the body 204 along the rotational direction 212.

The cleaning device 200 may have various elements to provide desired functions, e.g., cleaning, repairing, etc. Both FIGS. 2A and 2B illustrate these possibilities. Those skilled in the art would recognize that other configurations and/or functionalities may also be added. To provide a cleaning function, a first portion 240 of the body 204 may be provided with first cleaning elements 242. The first cleaning elements may be brushes or other known cleaning devices (e.g., magnets or blades). In another embodiment, a second portion 250 of the body 204 may be provided with second cleaning elements 252 different from the first cleaning elements 242. For example, the first cleaning elements 242 may provide a rough cleaning (e.g., the brushes 242 have a low flexibility, i.e., are rigid) while the second cleaning elements 252 may provide a fine cleaning (e.g., the brushes 252 have a high flexibility, i.e., are soft). Thus, the first cleaning elements are provided closer to the head end 208 than the second cleaning elements. More than two cleaning portions may be provided along the body 204.

In another exemplary embodiment, a third portion 260 of the body 204 may be provided with repairing elements 262 for repairing small defects in the streamer 202. For example, the repairing elements 262 may smooth a skin surface of the streamer 202 by polishing it or may apply a wax or another substance to the streamer. Those skilled in the art would recognize that other repairing elements may be used. The third portion 260 may be used together with the first portion 240, or together with the first and second portions 240 and 250, respectively, or by itself.

Next, the various functionalities of the cleaning device 200 are discussed. For achieving the cleaning and/or the repairing functions, the cleaning device 200 needs to rotate relative to the streamer 202. The rotation of the cleaning device is achieved with the wings 220. Alternatively or in addition, the movement-generating device 206 may also be used to rotate the cleaning device 200. The cleaning and/or repairing functions are enhanced when the cleaning device 200 also moves along the X axis relative to the streamer 202. This capability is achieved with the movement-generating device 206 when the streamer is towed underwater. As the streamer 202 moves along the positive direction of axis X, the cleaning device 200 moves along the negative direction of axis X due to the movement-generating device 206. Thus, the cleaning device may simultaneously rotate relative to the streamer and advance along the X axis relative to the streamer.

The combined rotation and translation of the cleaning device relative to the streamer is useful not only for cleaning and/or repairing, but also for passing various obstacles present along the streamer as discussed next.

For advancing along the streamer and over the various devices 230 attached to the streamer 202, e.g., a bird (i.e., a device for controlling a position of the streamer that may include wings extending away from the streamer) or a compass or another mounting unit, a step (or wavelength) of the shape of the body 204 is chosen to have a size L larger than a size D of the bird or compass, i.e., L>D. In this way, the cleaning device 200 is capable of passing the bird (or other device attached to the streamer) as illustrated in FIGS. 4A-D without outside help or manual intervention. FIGS. 4A-D show only the body 204 and the movement-generating device 206 passing the bird 230 as the body 204 advances along the streamer 202.

As discussed above, one force that makes the cleaning device 200 advance along the streamer 202 is generated by the movement-generating device 206. This is illustrated in FIGS. 4A-D by the first force $F_{front}$. However, a second force $F_{back}$ is generated by the wings 220, and this force also pushes the cleaning device 200 to advance along the streamer 202 in addition to rotating the cleaning device 200.

This second force has another beneficial effect as discussed now with regard to FIGS. 5A-B. During normal operations, e.g., when the cleaning device 200 does not encounter any obstacle 230, the first force $F_{front}$ is larger than the second force $F_{back}$ (or substantially equal). This is achieved by appropriately sizing the movement-generating device 206 and the wings 220 while taking into account the flexibility of the body 204. Because of this force relation, the cleaning device 200 is tightly extended along the streamer such that a (radial) clearance distance $CL_1$ has a predetermined value, for example, such that the cleaning elements 242 touch the streamer 202 for a given velocity (e.g., 5 knots) of the streamer. The clearance distance $CL_1$ may be adjusted before the streamer is towed under water to have a desired value.

In the eventuality that the cleaning device 200 encounters an obstacle 230 as illustrated in FIG. 5A, and the cleaning device 200 is so positioned that the head portion 208 of the body 204 cannot pass the obstacle, the following events take place. The first force $F_{front}$ is essentially cancelled out by an opposite force $F_{opposite}$ produced by the obstacle 230. Thus, the second force $F_{back}$ starts to compress the body 204 so that the step L is reduced to a step L' as illustrated in FIG. 5B, where L'<L. As a consequence of this compression, the clearance distance $CL_2$ is increasing, as also illustrated in FIG. 5B. In this way, the body 204 changes its shape, making easier to pass the obstacle 230 either because a larger force is applied to the head portion ($F_{front}$ plus the spring force generated by the compression of the body) or because the clearance between the body 204 and the streamer 202 is increased beyond, for example, the size of the obstacle.

In one exemplary embodiment, the cleaning device may have a length of about 10 m and may be configured to move along the entire length of the streamer. In one exemplary embodiment, the cleaning device is provided with an anti-fouling coating to prevent marine animals from attaching to it. In one application, an anti-sticking coating is provided inside the cleaning device to improve the rotation of the cleaning device relative to the streamer. In still another application, both ends of the cleaning device are provided with a corresponding movement-generating device. In another application, the wings or vanes of the cleaning device are foldable for easy stowing and deploying, while in another application the wings are inflated by the water when towed.

Figure 6:
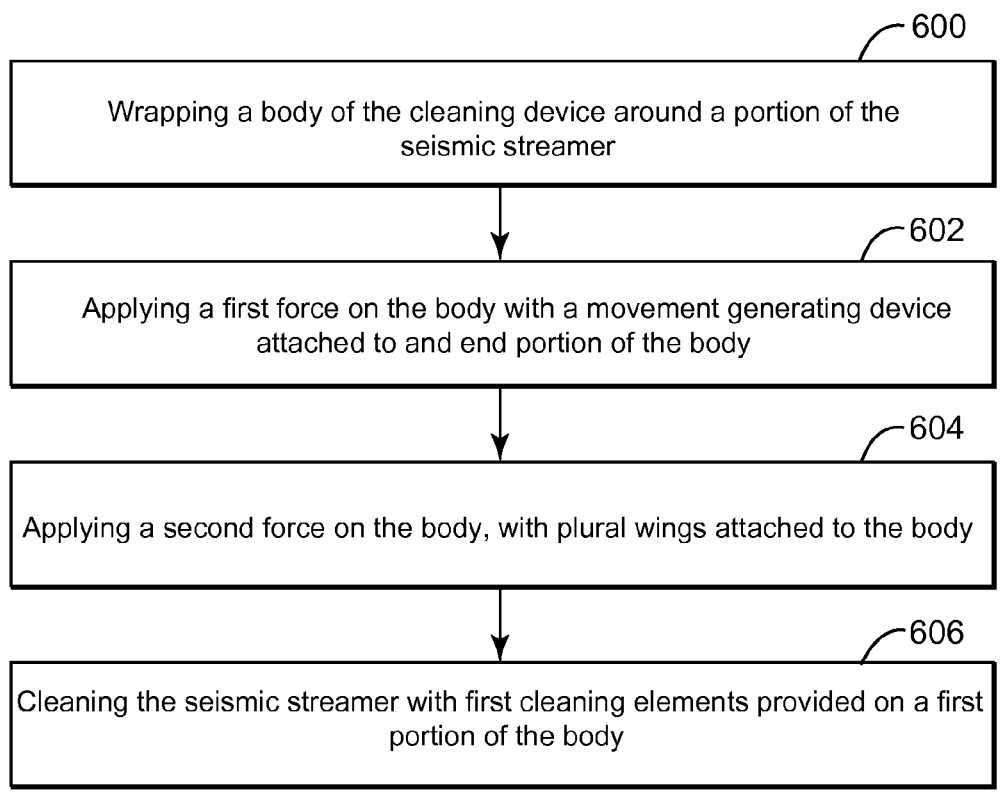
FIG. 6 is a flowchart of a method for cleaning a streamer with a cleaning device according to an embodiment.

According to an exemplary embodiment illustrated in FIG. 6, there is a method for cleaning a seismic streamer with a cleaning device. The method includes a step 600 of wrapping a body of the cleaning device, wherein the body has a spiral or helicoidal shape, around a portion of the seismic streamer; a step 602 of applying a first force on the body with a movement-generating device attached to an end portion of the body; a step 604 of applying a second force on the body with plural wings attached to the body; and a step 606 of cleaning the seismic streamer with first cleaning elements provided on a first portion of the body. The first and second forces act on the body to move it along the seismic streamer in a direction opposite to a movement of the streamer.

The disclosed exemplary embodiments provide a system and a method for cleaning a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cleaning device for cleaning a seismic streamer, the cleaning device comprising:
    a body having a helicoidal or spiral shape that twists around a longitudinal axis;
    a movement-generating device attached to an end portion of the body; and
    first cleaning elements provided on a first portion of the body and configured to clean the seismic streamer,
    wherein the body is configured to twist around the seismic streamer.

2. The cleaning device of claim 1, wherein the movement-generating device generates a first force that moves the body along the streamer when the streamer is towed in water.

3. The cleaning device of claim 2, further comprising:
    plural wings attached along the body and configured to provide a second force on the body.

4. The cleaning device of claim 3, wherein the first and second forces have the same direction.

5. The cleaning device of claim 1, further comprising:
    second cleaning elements provided on a second portion of the body and configured to clean the seismic streamer.

6. The cleaning device of claim 5, wherein the first cleaning elements are softer than the second cleaning elements.

7. The cleaning device of claim 5, further comprising:
    repairing elements provided on a third portion of the body and configured to repair defects in the seismic streamer.

8. The cleaning device of claim 1, wherein the body is configured to rotate and translate relative to the seismic streamer.

9. The cleaning device of claim 1, wherein the body is flexible and it is configured to compress when the first portion is blocked by an obstacle attached to the streamer.

10. The cleaning device of claim 1, wherein the body changes its shape when the first portion is blocked by an obstacle attached to the streamer so that a radial clearance between the body and the seismic streamer increases.

11. The cleaning device of claim 10, wherein a net force, along the streamer, on the body increases when the first portion is blocked.

12. The cleaning device of claim 11, wherein the body passes the obstacle as the radial clearance and the net force increase.

13. The cleaning device of claim 10, wherein the obstacle is a bird.

14. The cleaning device of claim 1, wherein the movement-generating device is an anchor.

15. A cleaning system for a seismic survey system, the cleaning system comprising:
- a cable towed in water; and
- a cleaning device for advancing along the cable, the cleaning device comprising:
- a body having a helicoidal or spiral shape that twists around a longitudinal axis;
- a movement-generating device attached to an end portion of the body and configured to generate a first force along the cable;
- plural wings attached to the body and configured to generate a second force along the cable; and
- first cleaning elements provided on a first portion of the body and configured to clean the cable,
- wherein the body is configured to twist around the cable and the first and second forces act on the body to move it along the cable in a direction opposite to a movement of the cable.

16. The cleaning device of claim 15, further comprising:
- second cleaning elements provided on a second portion of the body and configured to clean the cable, wherein the first cleaning elements are softer than the second cleaning elements; and
- repairing elements provided on a third portion of the body and configured to repair defects in the cable.

17. The cleaning device of claim 15, wherein the body is configured to rotate and translate relative to the cable, and the body is also configured to compress when the first portion is blocked by an obstacle attached to the cable.

18. The cleaning device of claim 15, wherein the body changes its shape when the first portion is blocked by an obstacle attached to the cable so that a radial clearance between the body and the cable increases and a net force on the body increases along the cable.

* * * * *